C. R. UNDERHILL.
GEAR SHIFTING MECHANISM.
APPLICATION FILED MAR. 12, 1917.
1,353,438.
Patented Sept. 21, 1920.
3 SHEETS—SHEET 3.
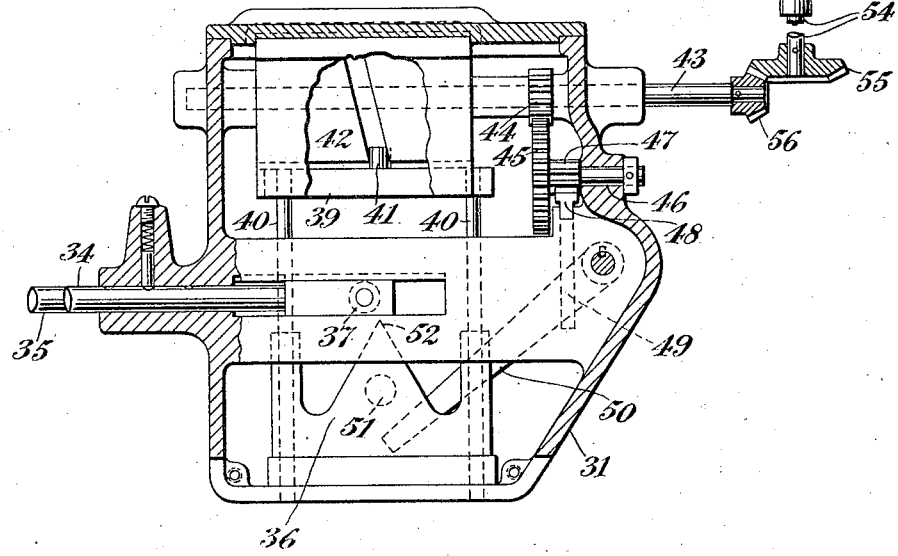
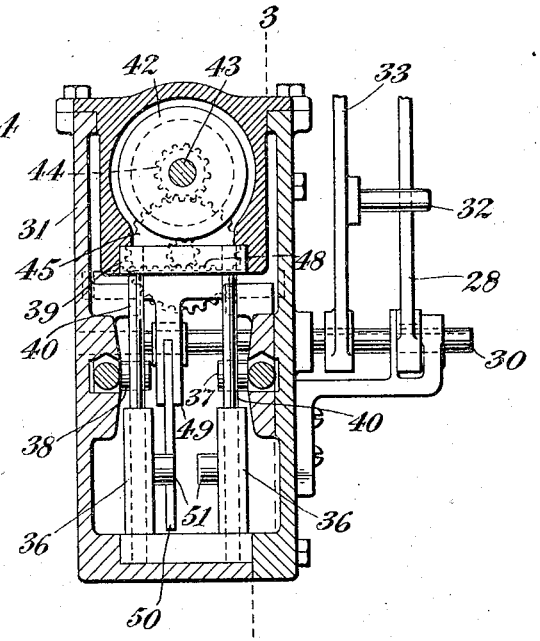
Inventor
Chas. R. Underhill
By his Attorney

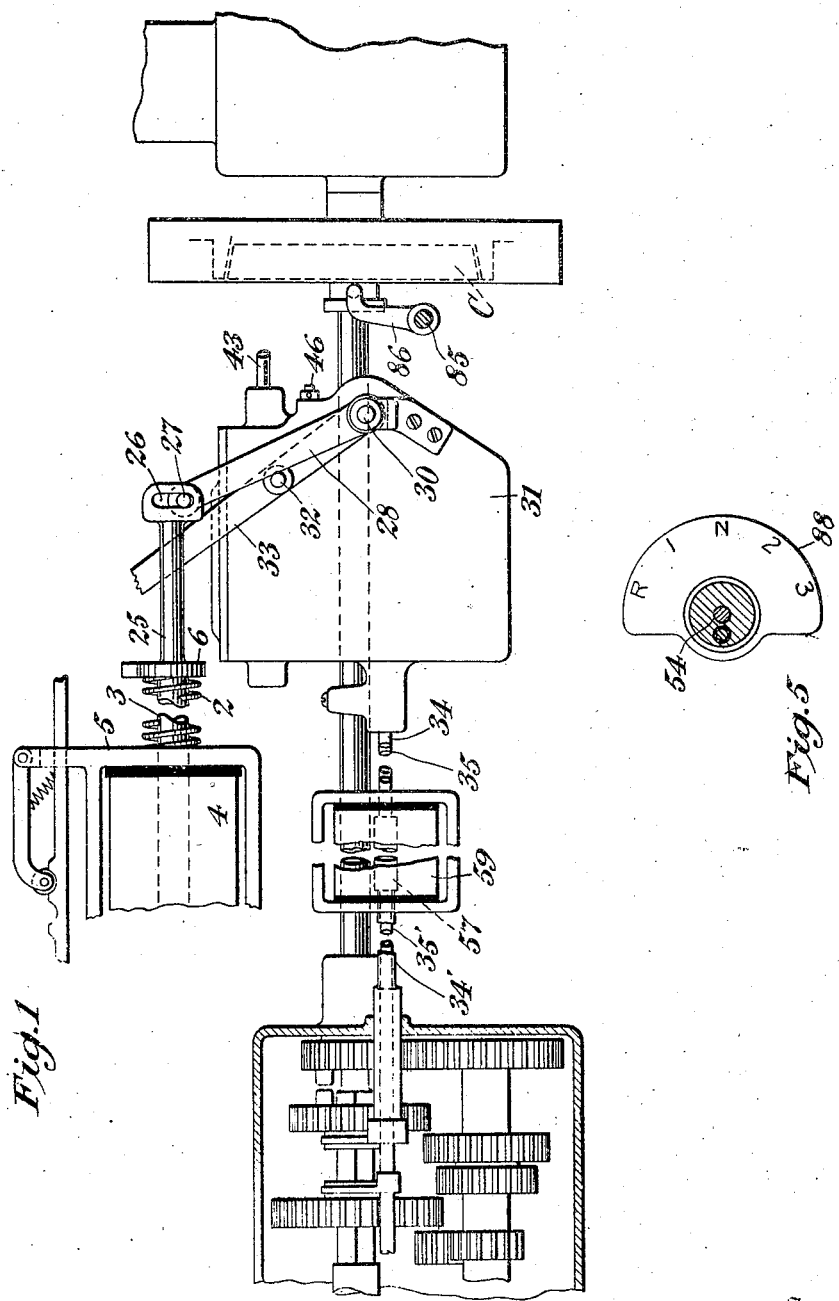

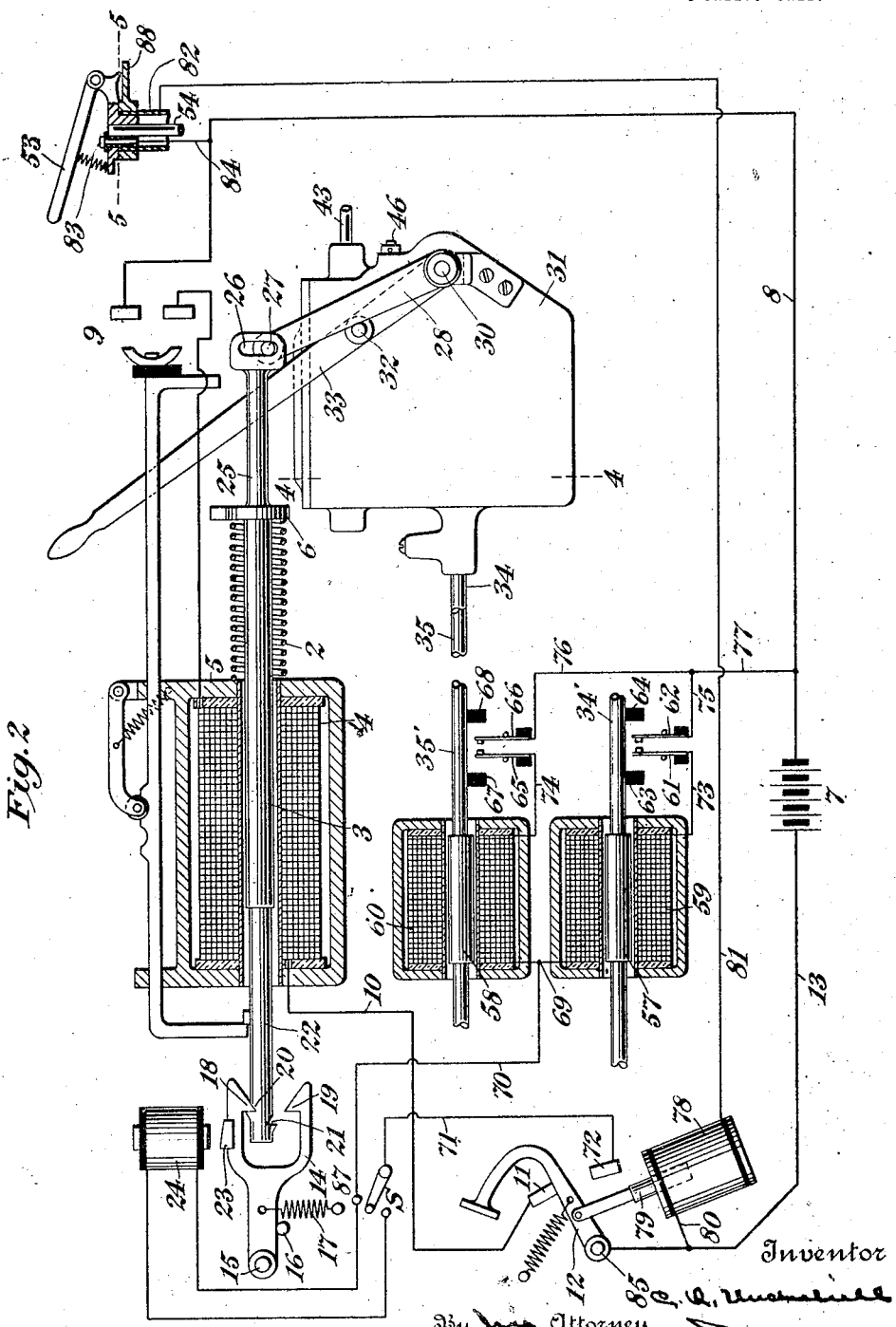

UNITED STATES PATENT OFFICE.

CHARLES R. UNDERHILL, OF NEW HAVEN, CONNECTICUT.

GEAR-SHIFTING MECHANISM.

1,353,438.  Specification of Letters Patent.  Patented Sept. 21, 1920.

Application filed March 12, 1917. Serial No. 154,298.

*To all whom it may concern:*

Be it known that I, CHARLES R. UNDERHILL, a citizen of the United States, and resident of New Haven, in the county of New Haven and State of Connecticut, have invented certain new and useful Gear-Shifting Mechanism, of which the following is a specification.

This invention relates to gear shifting mechanism and especially to gear shifting mechanism for motor cars and motor trucks, and its principal object is to provide improved means for controlling various parts of gear shifting mechanism of this type, and especially of the class of gear shifting mechanism patented by me November 3, 1914, No. 1,115,876.

Among other features, the invention provides improved means for controlling the movements of the main power device for shifting the gears, and also provides means whereby the operating speeds of some portions of the mechanism are increased. Means are also provided whereby certain portions are simplified and in other portions I provide for greater ease of operation of the parts directly operated by the driver. In connection with the last mentioned features I have provided new and improved means for connecting and disconnecting the motive power of the motor car from the gearing when making gear-shifting movements.

The main gear meshing operations are performed by power devices of the same type as those disclosed in the above-named patent, but in place of the mechanically operated devices for bringing the gear shifting devices to the neutral position or that out of mesh, which are disclosed therein, I provide other means for performing the same automatically before each gear meshing movement. The advantage of this lies in the saving of time, together with the simplification of the operating mechanism for said operations.

In connection with the above neutralizing movement I provide novel means for bringing into operation the main power device for bringing about the gear meshing movements, which means are dependent upon the previous completion of the neutralizing movement of the meshed shiftable gears. These means include latch or let-off mechanism of novel construction which is combined with novel control of the mechanism for disconnecting and connecting the clutch of the power shaft. The said operation of the clutch and the association therewith of the above-mentioned operations of the main power device result in greater ease of operation for the driver and greater speed of operation of the operating parts themselves.

The means I employ for accomplishing the objects of my invention together with other advantageous features not hereinbefore referred to are illustrated in the accompanying drawings, in which,—

Figure 1 is a side elevation illustrating my improved gear shifting mechanism;

Fig. 2 is a diagrammatic view illustrating the same;

Fig. 3 is a section taken on the line 3—3 of Fig. 4 and illustrating still further, part of the mechanism shown in Fig. 1;

Fig. 4 is a section taken on the line 4—4 of Fig. 2, and

Fig. 5 is a detail of the dial of the selecting member, taken on the line 5—5 of Fig. 2.

Similar characters refer to like parts in all the figures of the drawings.

The mechanism for producing the gear meshing movements comprises a compression spring 2 located on an extension of the core 3 of a solenoid 4 between the frame of the solenoid and a collar 6 on the core. The means for putting said spring under compression comprise a battery 7, conductor 8, switch mechanism 9, the conductor therefrom, the solenoid 4, conductor 10, contact 11, clutch lever 12 and conductor 13, which are similar to the mechanism disclosed in my before-mentioned prior patent.

For holding the spring 2 under compression I use a latch member 14 of novel construction. This latch member is pivoted at 15 and is normally held against a stop 16 by means of a spring 17. At the other end of the latch member I provide a fork having two branches which have teeth designated by the numerals 18 and 19, which teeth are adapted to engage respectively with notches 20 and 21 in the extended portion 22 of the solenoid core 3. On the upper branch of the fork is fitted an armature 23, which is attracted by the electro-magnet 24 when the same is energized. At the time the core 3 is drawn back under the action of the solenoid 4, the electro-magnet 24 is de-energized and the tooth 18 enters the notch 20 under the action of the spring 17. When the armature 23 is attracted by the electro-magnet 24, the tooth 18 is drawn out of the notch 20, but at the same time the tooth 19 is raised to a position where it will catch the notch 21 as the core 3 is pushed to the right under the action of the spring 2. The core is therefore arrested after moving a very small distance, not sufficient to initiate any gear shifting movement, and is held in this position until the electromagnet 24 is de-energized, at which time it is fully released and the spring 2 effects a gear shifting movement.

The core 3 is provided with an extension 25 having a slot 26 engaging a pin 27 on a lever 28, which is attached to a shaft 30, journaled in the casing 31. The lever 28 engages a long pin 32 on a lever 33 loosely mounted on the shaft 30, said lever 33 being provided for manual operation of the parts if at any time the power device is not in condition for operation.

The gear shifting movements in my improved gear shifting mechanism are effected by means of suitable mechanism such as that shown in Fig. 1 at the left, and which is attached to the rods 34 and 35 similar to those of my prior patent. The casing 31 of my present invention is narrower than that of the former patent by reason of the omission of mechanism formerly used for bringing the gear shifters to the neutral position, or that in which the gears connected thereto are out of mesh.

The casing 31 contains two cams 36, similar to cams in my prior patent, and operating on rolls 37 and 38 to move the shifter rods. 39 is a movable frame having rods 40 on which the cams 36 slide, and having a pin 41 engaging the barrel cam 42 on the shaft 43. Secured to the shaft 43 is the pinion 44, meshing with the gear 45, turning on the stud 46, and secured to another pinion 47, which meshes with a rack 48, to which is connected the fork 49, placed so as to move the lever 50 sidewise to any one of five positions corresponding to the different positions of the selecting member or lever 53. The lever 50 is adapted to be oscillated by the turning of the shaft 30 on which it is secured by a key and the end of said lever engages one or the other of the rolls 51 on the cams 36, to move said cams upward on the rods 40, and thereby giving movement to the shifter rods 34 and 35 by means of the rolls 37 and 38.

The barrel cam is moved at the same time as the fork 49, and moves the frame 39 backward or forward, so that when the cams move upward and the apexes 52 of the same are at the right of the rolls 37 and 38, either one of the left-hand cam inclines can come against one of the rolls and cause the rod to which it is attached to be moved to the left. And if the apexes are at the left of the rolls 37 and 38 and either of the cams is moved upward, its rod is moved to the right. The barrel cam is turned by means of the lever 53 attached to the shaft 54, which is connected by bevel gears 55 and 56 to the shaft 43, the said lever 53 being a combined selector and controller.

The gears of a motor car or truck must never be left in a disconnected condition except momentarily during the gear shifting operations. During these operations it is necessary to bring the gears to a neutral position or position out of mesh, and in my present invention I have provided improved means for bringing this about.

On the extensions 34' and 35' of the gear shifter rods 34 and 35 I have provided enlarged portions 57 and 58 which form the cores of electrical power devices such as the solenoids 59 and 60. These solenoids are electrically arranged in parallel and connected to the source of electrical energy or battery 7. Each solenoid is arranged in a local circuit that is provided with a break, which is controllable in two directions by the shifter rod associated with the particular solenoid. The break in the local circuit of the solenoid 59 is that between the spring contacts 61 and 62, and which is closed whenever a gear connected to the shifter rod 34 is in mesh, by means of one of the pins 63 or 64 of insulating material, which act to close the contacts by pressing one against the other. The break in the local circuit of the solenoid 60 is that made by the spring contacts 65 and 66, which are brought to their closed position by pins 67 and 68 of insulation on the shifter rod 35.

The windings of the solenoids 59 and 60 are connected together by a conductor 69, and joined to said conductor 69 is a conductor 70 connecting it to the electro-magnet 24, which in turn is connected by a conductor 71 to the contact 72 opposite the contact 11 next to the clutch lever 12. Conductors 73 and 74 connect the solenoids 59 and 60 to the springs 61 and 65 respectively, and the springs 62 and 66 are connected to conductors 75 and 76 respectively, which in turn are connected to a conductor 77 joined to the main 8. The circuit of the solenoids 59 and 60 and the electromagnet 24 is controlled by depressing the clutch lever 12 against the contact 72. It will be noticed that there is a break in the circuit at this point which is normally open, and it will therefore be apparent that the solenoids 59 and 60 cannot act until the motor is disconnected from the gearing connected to the shifter rods, by opening of the clutch. In connection with releasing magnet 24 and solenoids 59 and 60 I have provided a cut-out switch S in the conductor 71, in case it is desired to release the clutch lever 12 without shifting the gears, and which is arranged to be opened at such times, but to be closed in the operation of the gear shifting devices.

For greater ease of operating the clutch lever 12 and clutch C, I have provided an electrical power device, such as the solenoid 78, whose core 79 is connected to the clutch lever 12 and is effective to draw down the same when the solenoid is energized. The solenoid 78 is connected to the source of electrical supply by the conductor 80 joined to the main 13, while a conductor 81 joins the solenoid to the steering tube 82 on which it is grounded. The solenoid is brought into operation by means of a circuit closer, such as the lever 53, which is depressed onto the contact 83 when it is desired to operate the solenoid, and connection from the contact is made to the main 8 by a short conductor 84.

The lever 53 controls the selection of the gear shifting operations and operates by turning the shaft 54, connected by the bevel gears 55 and 56 to the shaft 43. When the selection has been made by the said turning of the lever, the lever is pressed down onto the contact 83 which closes the circuit of the solenoid 78, and the clutch lever 12 is brought down onto the contact 72, thus closing the circuit containing the magnet 24 and solenoids 59 and 60 at the time the clutch is disconnected by means of the shaft 85 and lever 86 so that the gears can be safely moved out of mesh. On the closing of the neutralizing circuit, current from the battery flows through the main 8, conductor 77 to the junction of the conductors 75 and 76, at which point if the springs 62 and 61 are in contact, the current flows through conductor 75, springs 62 and 61, conductor 73, winding of the solenoid 59, conductor 69, while, if the springs 66 and 65 are in contact, the current flows through conductor 76, springs 66 and 65, conductor 74, winding of the solenoid 60 and conductor 69, where circuits through both solenoid windings continues through the conductor 70, electromagnet 24, conductor 71, contact 72, clutch lever 12, main 13 to the battery 7. The effect of energizing the solenoids 59 and 60 is, that any shiftable gear that is at that time in mesh, is brought out of mesh to the neutral position by moving either the rod 34 or the rod 35 and mechanism connected therewith. The energizing and subsequent deënergizing of the magnet 24, causes the release of the spring 2, thereby bringing about the meshing of the gears which it is desired should be brought into mesh. If it is desired to neutralize the gears independently of the gear meshing devices, the cut-out switch S can be placed on the contact 87, the selector lever 53 then moved opposite N on the dial 88, and when the lever is pressed down the gears are neutralized without bringing any into mesh afterward.

What I claim is:—

1. In a gear shifting mechanism, the combination with a pair of coöperative gears to be brought into mesh, and a normally energized power device for shifting one of said gears into mesh, of means for holding said power device under restraint which includes a two-stage let-off device effective for releasing the power device.

2. In a gear shifting mechanism, the combination with a pair of coöperative gears to be brought into mesh, and a spring normally under stress for shifting one of said gears into mesh, of means for holding said spring under stress which includes a two-stage let-off device effective for releasing said spring to shift said gear.

3. In a gear shifting mechanism, the combination with a pair of coöperative gears to be brought into mesh, and a normally energized power device for shifting one of said gears into mesh, of means for holding said power device under restraint which includes a double acting latch which is effective for releasing said power device in a definite time interval.

4. In a gear shifting mechanism, the combination with a pair of coöperative gears to be brought into mesh, and a normally energized power device for shifting one of said gears into mesh, of means for holding said power device under restraint which includes a latch, and mechanism effective for moving the latch in two directions, for releasing the power device.

5. In a gear shifting mechanism, the combination with a pair of coöperative gears to be brought into mesh, a normally energized power device for shifting one of said gears into mesh, and means for bringing one of said gears to a neutral position, of means for holding the power device under restraint which automatically releases the same when said gear has attained the neutral position.

6. In a gear shifting mechanism, the combination with a plurality of pairs of coöperative gears, and means for bringing them into mesh, of electrical means for bringing all meshed shiftable gears to neutral positions before each meshing movement, said neutralizing means being automatically rendered inactive during gear meshing movements.

7. In a gear shifting mechanism, the combination with a pair of coöperative gears, and means for bringing them into mesh, of means for bringing one of said gears to a neutral position before each meshing movement and which means include an electrical power device in a circuit including a source of electrical energy and means for opening a break in said circuit on the completion of the neutralizing movement.

8. In a gear shifting mechanism, the combination with a pair of coöperative gears and means for bringing them into mesh, of means for bringing one of said gears to a neutral position before each meshing movement and which means include an electrical power device in a circuit with a source of electrical energy, means for opening a break in said circuit on completion of the neutralizing movement, and means for closing said break on completion of the meshing movement.

9. In a gear shifting mechanism, the combination with a plurality of pairs of coöperative gears, and means for bringing them into mesh at different times, of means for bringing each meshed shiftable gear to a neutral position before each meshing movement, and which means embody a plurality of electrical power devices each in a local circuit, and means for opening a break in the operating local circuit on the completion of a neutralizing movement.

10. In a gear shifting mechanism, the combination with a plurality of pairs of coöperative gears, and means for bringing them into mesh at different times, of means for bringing each meshed shiftable gear to a neutral position before each meshing movement, and which means embody a plurality of electrical power devices in local circuits connected in parallel with a source of electrical energy, and means for opening a break in the operating local circuit on completion of a neutralizing movement.

11. In a gear shifting mechanism, the combination with a plurality of pairs of coöperative gears, and means for bringing them into mesh at different times, of means for bringing each meshed shiftable gear to a neutral position before each meshing movement and which means embody a plurality of electrical power devices in local circuits connected in parallel with a source of electrical energy, means for opening a break in the operating local circuit on the completion of a neutralizing movement and for closing said break on completion of a meshing movement.

12. In a gear shifting mechanism, the combination with a pair of coöperative gears to be brought into mesh, and a normally energized power device for shifting one of said gears into mesh, of means for holding the power device under restraint, and means for releasing it which embody an electrical power device included in a circuit with electrical means for bringing one of said gears to a neutral position before said gear shifting power device can be released.

13. In a gear shifting mechanism, the combination with a plurality of coöperative gears to be brought into mesh at different times, a normally energized power device for meshing said gears, and means for holding the power device under restraint, of means for releasing said gear meshing power device which includes an electrical power device in circuit with a plurality of other electrical power devices that are effective for neutralizing each meshed shiftable gear before the releasing power device can act.

14. In a gear shifting mechanism, the combination with a pair of coöperative gears, and means for bringing them into mesh, of means for bringing one of said gears to a neutral position before each meshing movement which means include a solenoid in a circuit with a source of electrical energy, and means for opening a break in said solenoid circuit on the completion of the neutralizing movement.

15. In a gear shifting mechanism, the combination with a plurality of pairs of coöperative gears, and means for bringing them into mesh at different times, of means for bringing each meshed shiftable gear to a neutral position before each meshing movement which means embody a plurality of solenoids each in a local circuit connected with a source of electrical energy, and means for opening a break in the operating local circuit on completion of a neutralizing movement.

16. In a gear shifting mechanism, the combination with a plurality of pairs of coöperative gears, and means for bringing them into mesh at different times, of means for bringing each meshed shiftable gear to a neutral position before each meshing movement, which means include a plurality of solenoids, each in a local circuit connected with a common source of electrical energy, means for opening a break in the operating local circuit on completion of a neutralizing movement and closing said break on completion of a meshing movement.

17. In a gear shifting mechanism, the combination with a plurality of pairs of coöperative gears and means for bringing them into mesh, of means operated independently of the gear meshing means for bringing all meshed shiftable gears to neutral positions before each meshing movement, said neutralizing means being automatically rendered inoperative during gear meshing movements.

18. In a gear shifting mechanism, the combination with a plurality of pairs of coöperative gears, and driving means therefor including a clutch, of single means for bringing any shiftable gear into mesh preceded by an automatic disconnection of the clutch, and a selector, said means being controlled by the selector which is effective for controlling each and all of the gear meshing movements.

19. In a gear shifting mechanism, the combination with a plurality of pairs of cooperative gears, and driving means therefor including a clutch, of single means for bringing any shiftable gear into mesh preceded respectively by an automatic disconnection of the clutch and an automatic neutralizing of all meshed shiftable gears, and a selector, said means being controlled by the selector which is effective for controlling each and all of the gear meshing movements.

20. In a gear shifting mechanism, the combination with a plurality of coöperative gears to be brought into mesh at different times, gear meshing means, and driving means for said gears including a clutch, of a mechanically operating device for controlling the meshing of the gears, and means for operating said device and governing the movements of said gear meshing means which include a solenoid effective for disengaging the clutch before each gear shifting movement.

21. In a gear shifting mechanism, the combination with a pair of coöperative gears to be brought into mesh, means for neutralizing one of said gears before a meshing movement, and a normally restrained spring for shifting said gear, of means for holding the spring under restraint which automatically release the spring on completion of the neutralizing movement.

22. In a gear shifting mechanism, the combination with a plurality of pairs of coöperative gears to be brought into mesh at different times, means for bringing all shiftable meshed gears to neutral before a gear shifting movement is started, and a normally energized power device for bringing shiftable gears into mesh, of means for holding the power device under restraint which automatically release the same when said neutralizing movements are completed.

23. In a gear shifting mechanism, the combination with a plurality of pairs of coöperative gears to be brought into mesh at different times, means for bringing all shiftable meshed gears to neutral before a gear shifting movement, and a normally restrained spring for bringing shiftable gears into mesh, of means for holding the spring under restraint which automatically release the same on completion of the neutralizing movements.

24. In a gear shifting mechanism, the combination with a plurality of coöperating gears to be brought into mesh, a single means for meshing said gears, a pre-selector effective to control the meshing of the gears, means for operating said pre-selector, driving means for said gears, a clutch carried thereby, electrically controlled means for disconnecting the clutch, said pre-selector operating means also adapted to render operative said electrically controlled means by closing the circuit for shifting the gears.

25. In a gear shifting mechanism, the combination with a plurality of pairs of coöperative gears to be brought into mesh at different times, of means for meshing said gears, a selector comprising a mechanically operating device effective to control the meshing of the gears, means for operating said device, and neutralizing means embodying a plurality of electrical power devices arranged to act selectively for bringing meshed shiftable gears out of mesh.

26. In a gear shifting mechanism, the combination with a plurality of pairs of coöperative gears to be shifted into mesh, of means for meshing said gears, a selector comprising a mechanically operating device effective to control the meshing of the gears, means for operating said device, and neutralizing means embodying a plurality of electromagnets arranged to act selectively for bringing all meshed shiftable gears out of mesh.

27. In a gear shifting mechanism, the combination with a plurality of pairs of coöperative gears to be shifted into mesh, means for meshing said gears, a selector comprising a mechanically operating device effective to control the meshing of the gears, means for operating said device, and neutralizing means embodying a plurality of solenoids arranged to act selectively for bringing all meshed shiftable gears out of mesh.

28. In a gear shifting mechanism, the combination with a pair of coöperative gears to be shifted into mesh, of means for meshing said gears, a selector comprising a mechanically operating device effective to control the meshing of the gears, means for operating said device, neutralizing means embodying a plurality of electrical power devices arranged in parallel for selectively bringing all meshed shiftable gears out of mesh.

29. In a gear shifting mechanism, the combination with a plurality of pairs of coöperative gears to be shifted into mesh, of means for meshing said gears, a selector comprising a mechanically operating device effective to control the meshing of the gears, means for operating said device, and neutralizing means embodying a plurality of electro-magnets arranged in parallel for selectively bringing all meshed shiftable gears out of mesh.

30. In a gear shifting mechanism, the combination with a plurality of pairs of coöperative gears to be shifted into mesh, of means for meshing said gears, a selector comprising a mechanically operating device effective to control the meshing of the gears, tralizing means embodying a plurality of means for operating said device, and neu- solenoids arranged in parallel for selectively bringing all meshed shiftable gears out of mesh.

Signed at New York, in the county of New York, and State of New York, this 7th day of March, A. D. 1917.

CHARLES R. UNDERHILL.

Witnesses:
CHAS. F. DANE,
C. J. BUTLER.